E. D. TILLYER.
LENS.
APPLICATION FILED JUNE 24, 1919.
1,356,670.
Patented Oct. 26, 1920.
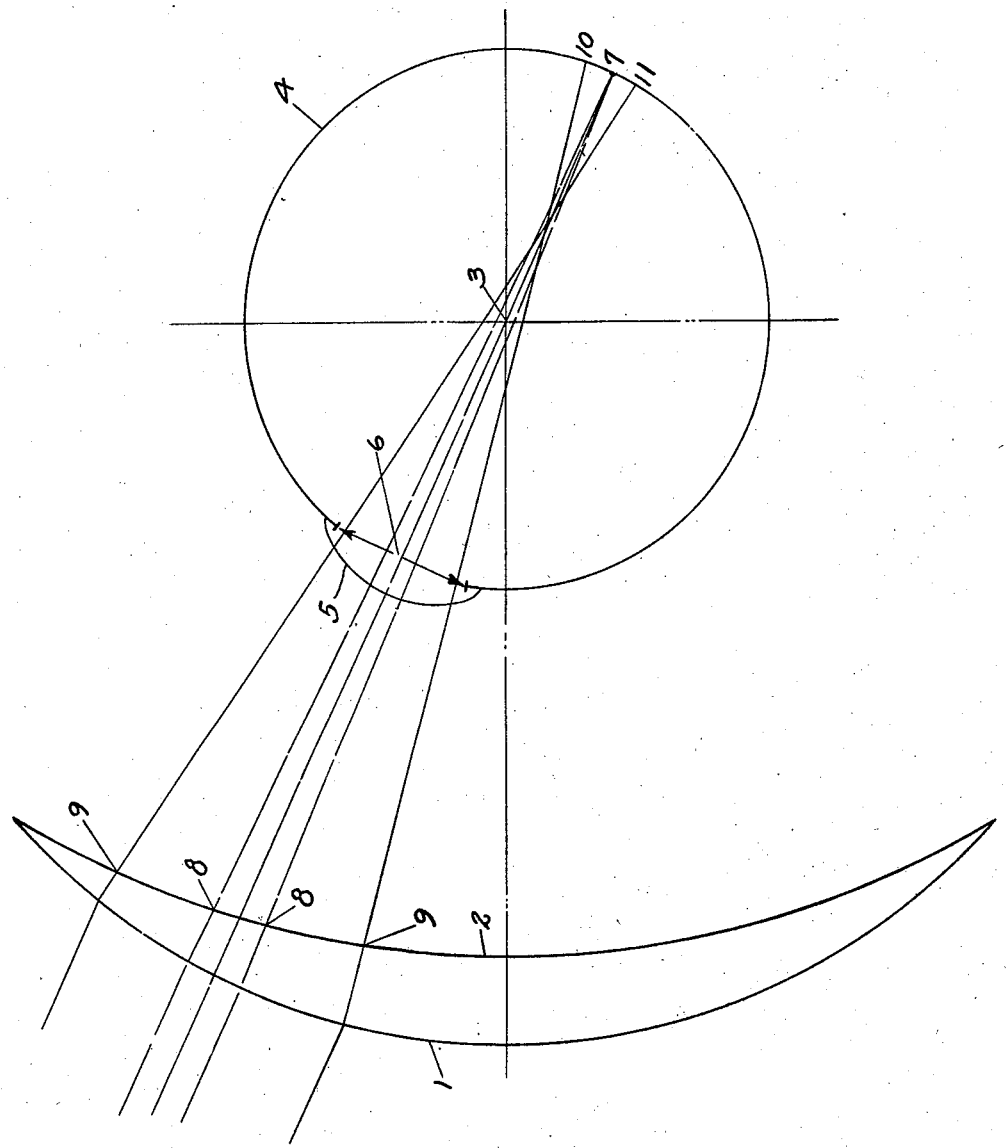
INVENTOR
E. D. TILLYER
BY
H. H. Styll, H. K. Parsons
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

1,356,670.    Specification of Letters Patent.    Patented Oct. 26, 1920.

Application filed June 24, 1919. Serial No. 306,368.

*To all whom it may concern:*

Be it known that I, EDGAR D. TILLYER, a citizen of the United States, residing at Southbridge, in the county of Worcester and State of Massachusetts, have invented certain new and useful Improvements in Lenses, of which the following is a specification.

This invention relates to ophthalmic lenses for the correction of errors of human vision and particularly to that type of lens which has been corrected for marginal aberrations of focus and astigmatism, and in addition thereto further corrected for errors due to the fact that the aperture of the eye has an appreciable magnitude instead of being a point; and the process of making such lenses.

The principal object of the invention is to provide an ophthalmic lens, and a way of making same, free from errors usually present in an ophthalmic lens caused by the magnitude of the aperture of the eye.

Other objects and advantages of the invention will be readily apparent by reference to the following specification taken in connection with the accompanying drawings, and it will be understood that I may make any modifications in the specific details of construction or steps shown and described within the scope of the appended claims without departing from or exceeding the spirit of my invention, the preferred form only being shown and described for sake of illustration.

To facilitate an understanding of the features hereinafter referred to I have appended a sheet of drawings illustrative of the same. Similar references throughout the specification and drawings refer to similar parts.

The figure represents a diagrammatic cross sectional view through the lens and the eye, showing the lines of vision for point aperture, and for wide aperture.

In ophthalmic lenses hitherto manufactured the calculations for the lens have always been based on the theory that the aperture of the eye was a point; that is that it was of infinitesimal size. Now, as a matter of fact, the aperture of the eye has dimensions; it is of appreciable size, and it is the object of my invention to take account of this size of aperture and to calculate the curves of the lens to compensate for or take care of this feature of vision.

In ophthalmic lenses there are two types of distortion present, one a function of the angular rotation of the eye, that is, the eye does not rotate as far with the lens on as it does when it is off in a negative lens, and vice versa for a positive lens. This type of distortion is a function of the distance of the center of rotation of the eye from the lens surface, as well as the ratio of the two surfaces of the lenses to each other, and is the one usually considered in a lens system.

However, the apparent distortion to the eye is not a function of the angular rotation of the eye but is a function of the pupil of the eye, and this has always been considered a function of the center of rotation of the eye and not of the pupil of the eye.

In my invention I deform the lens surface or surfaces in such a way as to correct the distortion at any individual point of the eye position and at the same time the astigmatism of the lens, the stop point for the astigmatism being the center of rotation of the eye, and that for the distortion the pupil position of the eye at that particular point of rotation of the eye in its socket.

Where the diameter of a bundle of rays is no longer very small, as usually assumed it is limited in oblique directions by the diameter of the pupil of the eye. Now, if we correct the power and astigmatism by shaping the lens we have no variable left to modify if we use spherical or toric surfaces, but in strong powers the aberrations, such as spherical power, coma, etc., are quite important due to the pupil not being a point as previously assumed. Therefore, I assume it has dimensions and correct the aberrations by deforming the surfaces themselves.

Referring to the drawings: the lens surfaces are represented by the characters 1 and 2, 1 being the front surface of the lens. 3 represents the center of rotation of the eye; 4 the eye ball; 5 the pupil; 6 the aperture of the pupil; 7 the position on the retina where the rays are brought to focus when the bundle is a small one, and the aperture of the pupil is considered to be a point. The small bundle of rays is represented by the lines 8—7, and the large bundle by the lines 9—11 and 9—10.

The lens shown has been first corrected for power and astigmatism using a small bundle of rays 8—7. Considering the pupil aperture as a point, the rays focus on the retina at 7. Having determined the curves to produce the lens for small aperture assumption, I next consider a large bundle of rays, as indicated by the lines 9—11 and 9—10, taking into account the full opening 6 of the pupil of the eye. It will be seen that these lines do not focus on the retina at 7, but cross each other at some other point, thus introducing aberrations. To correct these aberrations I deform the lens surfaces in such a way as to retain the original desired power and freedom from astigmatism and at the same time will cause the lines of the big bundle to focus at the proper point on the retina.

I may either grind the lens to the curves calculated for point aperture and deform the surfaces locally to correct the aperture aberrations, just as a telescopic lens is corrected by grinding away minutely until the lens is correct in all sections, or I may calculate such mathematical curves as will give the approximate desired results, and grind the surfaces to these curves on grinding mechanism designed to trace these mathematical curves.

A deformed curve is one which is not a regular spherical, cylindrical or toric curve, such as hitherto used in the manufacture of ophthalmic lenses but which is a variable curve, such as elliptical, parabolic, etc.

The calculations for determining the curves of the lens follow the usual formulae for calculating lens surfaces and are arrived at in a similar manner; these formulae and methods of calculating lens surfaces may be found in any textbook or treatise on lens grinding. The method of grinding the surfaces, including roughing, smoothing, polishing and finishing is the same as that for regular ophthalmic lenses, using the same kind of tools and grinding ingredients which are well known in the art.

Having described my invention, what I claim is:

1. The method of making ophthalmic lenses comprising making a lens with surfaces related to give desired focal and astigmatic values for a point aperture of the pupil of the eye, and altering said surfaces to correct for the width of the pupil opening.

2. An ophthalmic lens having surfaces related to give the desired focal and astigmatic values for point aperture of the pupil of the eye, one of said surfaces being deformed to correct for the width of the opening in the pupil of the eye.

3. An ophthalmic lens having its bounding surfaces related to give desired power of astigmatism about the center of rotation of the eye and deformed to produce the desired focal power for the actual aperture of the pupil of the eye.

In testimony whereof I have affixed my signature in presence of two witnesses.

EDGAR D. TILLYER.

Witnesses:
HARRY H. STYLL,
H. K. PARSONS.